(12) United States Patent
Mae

(10) Patent No.: US 7,904,669 B2
(45) Date of Patent: Mar. 8, 2011

(54) INFORMATION PROCESSING DEVICE, IMAGE PICKUP DEVICE, INFORMATION PROCESSING METHOD AND COMPUTER PROGRAM

(75) Inventor: Atsushi Mae, Kanagawa (JP)

(73) Assignee: Sony Corporation (JP)

( * ) Notice: Subject to any disclaimer, the term of this patent is extended or adjusted under 35 U.S.C. 154(b) by 702 days.

(21) Appl. No.: 11/599,155

(22) Filed: Nov. 14, 2006

(65) Prior Publication Data

US 2007/0150642 A1  Jun. 28, 2007

(30) Foreign Application Priority Data

Nov. 15, 2005 (JP) ................................ P2005-329723

(51) Int. Cl.
*G06F 12/00* (2006.01)
*G06F 13/00* (2006.01)
*G06F 13/28* (2006.01)

(52) U.S. Cl. ......... 711/154; 711/102; 711/103; 711/171; 711/E12.006

(58) Field of Classification Search .................. 711/102, 711/103, 154, 171
See application file for complete search history.

(56) References Cited

U.S. PATENT DOCUMENTS

| 6,016,530 | A | * | 1/2000 | Auclair et al. ..................... 711/6 |
| 6,412,080 | B1 | | 6/2002 | Fleming et al. |
| 2004/0041206 | A1 | * | 3/2004 | Bhattacharyya .............. 257/326 |
| 2004/0123020 | A1 | * | 6/2004 | Gonzalez et al. ............. 711/103 |
| 2004/0186946 | A1 | * | 9/2004 | Lee ............................... 711/103 |

FOREIGN PATENT DOCUMENTS

| JP | 2002-318714 A | 10/2002 |
| JP | 2004-071130 A | 3/2004 |

* cited by examiner

*Primary Examiner* — Matt Kim
*Assistant Examiner* — Michael Alsip
(74) *Attorney, Agent, or Firm* — Lerner, David, Littenberg, Krumholz & Mentlik, LLP

(57) ABSTRACT

An information processing device for executing a data recording process for a flash memory having a primary data storage region and a data storage region includes a control unit operable to detect a data recording state of the primary data storage region of the flash memory, and when the data recording state is a predefined state, to execute a data connecting process of connecting data recorded in the primary data storage region and a data writing process of writing the connected data in the data storage region.

8 Claims, 6 Drawing Sheets

INFORMATION PROCESSING DEVICE, IMAGE PICKUP DEVICE, INFORMATION PROCESSING METHOD AND COMPUTER PROGRAM

CROSS-REFERENCE TO RELATED APPLICATION

The present application claims priority from Japanese Patent Application No. JP 2005-329723 filed on Nov. 15, 2005, the disclosure of which is hereby incorporated by reference herein.

BACKGROUND OF THE INVENTION

1. Field of the Invention

The invention relates to an information processing device, an image pickup device, an image processing method and a computer program, and more particularly, to an information processing device; an image pickup device, an image processing method and a computer program, which is capable of reducing an invalid data region, which is generated in a data writing process for a non-volatile memory such as a flash memory, and maintaining data with certainty.

2. Background Art

Recently, as a data storage device of various electronic apparatuses such as personal computers (PC), data recording/reproducing devices, personal digital assistants (PDA) or video cameras, a flash memory is widely used. The flash memory, which is capable of easily writing and erasing data, has properties such as a small size, a light weight, a high speed and a lower power consumption and is used as a storage medium of image data, sound data, a text file, a program or the like.

More particularly, a memory card in which a flash memory can be attached and detached to and from an electronic apparatus is widely used. For example, a memory card for storing image data acquired by a video camera is mounted and reproduced in a PC or music data acquired through the Internet using a PC or from a storage medium such as CD, DVD or MD is stored in a memory card and the memory card is mounted and reproduced in a portable player.

As shown in FIG. 1, in a flash memory, a block 110 which is a unit for erasing data and a page 120 which is a unit for reading and writing data are defined. The flash memory has a plurality of blocks and one block includes a plurality of pages. One page includes, for example, a 512-byte data storage region 121 and a 16-byte expanded region (extra region) 122 for writing parity data. The sizes of data storage region and the expanded region vary depending on the flash memory. For example, there may be provided a combination of a 2048-byte data storage region 121 and a 64-byte expanded region (extra region) 122.

Recently, in accordance with a high speed and a large capacity, the size of a minimum unit (page) for writing data or a minimum unit (block) for erasing data in the flash memory has increased. However, the size of data which is desired to be stored in the flash memory, that is, data of one-time recording process, may be very smaller than that of the page defined in the flash memory. When the data is recorded without alteration, a large invalid data region exists in the page and, as a result, the amount of valid data written in the entire flash memory is reduced.

As a method of suppressing the generation of an invalid data region, the following two configurations have been suggested.

In a first configuration, for example, a writing process is not executed until data to be written, for the size of a page, is collected, the data is stored in a volatile memory such as a RAM in a device, and the data is written in the flash memory when the data for the size of the page defined in the flash memory is stored. By this configuration, the invalid region of the flash memory can be reduced.

In a second configuration, data is sequentially written in a flash memory, valid data in a plurality of pages are read and connected by a defragment process such that an invalid region is reduced in the pages of the flash memory in which data is written, and the data is newly written. Even by this configuration, the invalid region of the flash memory can be reduced.

However, in the first configuration, since the data is not written in the flash memory until the size of the data stored in the volatile memory such as RAM becomes the size of the page, when a power source is suddenly turned off while a photographing/recording process is executed by a video camera, that is, while a data recording process is executed in an information processing device, the data stored in the volatile memory such as RAM is lost and data for the size of the page of the flash memory may be fully lost.

In the second configuration, the data written in the flash memory is read, connected and rewritten, a chain structure between the pages is managed before the connecting and rewriting process, and the rewriting process is executed in consideration of the information on the chain structure upon the connecting and rewriting process and the layout of the data in a non-volatile memory. Thus, a process becomes complicated. In addition, for the above-described process, management data should be stored, a region for storing the management data should be ensured, and, as a result, the size of a connecting/rewriting program increases.

SUMMARY OF THE INVENTION

It is desirable to provide an information processing device, an image pickup device, an image processing method and a computer program, which are capable of preventing data having a size equal to or smaller than that of a page defined as a minimum data writing unit in a flash memory from being lost by sudden power-off and performing a connecting and rewriting process by a simple process without maintaining information on a complicated chain structure between valid data to reduce an invalid region of the flash memory and to maintain data with more certainty.

According to an embodiment of the invention, there is provided an information processing device for executing a data recording process for a flash memory having a primary data storage region and a data storage region, the device including a control unit operable to detect a data recording state of the primary data storage region of the flash memory, and when the data recording state is a predefined state, to execute a data connecting process of connecting data recorded in the primary data storage region and a data writing process of writing the connected data in the data storage region.

In the information processing device according to the embodiment of the invention, the predefined state may be a state in which a recordable page does not exist in the primary data storage region, and the control unit may be operable to execute the data connecting process and the data writing process when the recordable page does not exist in the primary data storage region with respect to a page which is a data recording unit of the flash memory.

In the information processing device according to the embodiment of the invention, the predefined state may be a state in which the total amount of data recorded in the primary data storage region and data to be recorded exceeds the amount of data of a page which is a data recording unit of the flash memory.

In the information processing device according to the embodiment of the invention, the control unit may be operable to maintain values indicating a start state and an end state of data movement as state values of the primary data storage region and the data storage region and to execute a process of updating the state values when executing the data connecting process and the data writing process.

In the information processing device according to the embodiment of the invention, the control unit may be operable to set the state value of the primary data storage region to a movement start state value before executing a process of copying the data recorded in the primary data storage region in a work area, to set the state value of the data storage region to a movement start state value before executing the data writing process for the connected data generated in the work area, and to set the state values of the primary data storage region and the data storage region to a movement end state value when the writing process for the connected data generated in the work area is finished.

According to another embodiment of the invention, there is provided an image pickup device including a camera unit operable to photograph a moving picture or a still image; a flash memory having a primary data storage region and a data storage region; and a control unit operable to detect a data recording state of the primary data storage region of the flash memory, and, when the data recording state is a predefined state, to execute a data connecting process of connecting data recorded in the primary data storage region and a data writing process of writing the connected data in the data storage region.

According to another embodiment of the invention, there is provided an information processing method for executing a data recording process for a flash memory having a primary data storage region and a data storage region. The method includes executing the data recording process for the primary data storage region of the flash memory; detecting a data recording state of the primary data storage region; and when the detected data recording state is a predefined state, executing a data connecting process of connecting data recorded in the primary data storage region and a data writing process of writing the connected data in the data storage region.

In the information processing method according to the embodiment of the invention, the predefined state may be a state in which a recordable page does not exist in the primary data storage region with respect to a page which is a data recording unit of the flash memory.

In the information processing method according to the embodiment of the invention, the predefined state may be a state in which the total amount of data recorded in the primary data storage region and data to be recorded exceeds the amount of data of a page which is a data recording unit of the flash memory.

The information processing method according to the embodiment of the invention may further include maintaining values indicating a start state and an end state of data movement as state values of the primary data storage region and the data storage region; and executing a process of updating the state values when executing the data connecting process and the data writing process.

In the information processing method according to the embodiment of the invention, the process of updating the state values may include setting the state value of the primary data storage region to a movement start state value before executing a process of copying data recorded in the primary data storage region in a work area, setting the state value of the data storage region to a movement start state value before executing the data writing process for the connected data generated in the work area, and setting the state values of the primary data storage region and the data storage region to a movement end state value when the writing process is finished.

According to another embodiment of the invention, there is provided a computer program for causing an information processing device to execute an information processing method for executing a data recording process for a flash memory having a primary data storage region and a data storage region. The information processing method includes executing the data recording process for the primary data storage region of the flash memory; detecting a data recording state of the primary data storage region; and when the detected data recording state is a predefined state, executing a data connecting process of connecting data recorded in the primary data storage and a data writing process of writing the connected data in the data storage region.

The computer program according to the embodiment of the invention is a computer program provided by a communication medium or a storage medium provided to a general-purpose computer system for executing various programs and codes in a computer readable format, for example, a communication medium such as a network or a storage medium such as CD, FD or MO. By providing such a program in the computer readable format, a process according to the program is realized on the computer system.

The above and other features and advantages of the invention will become more apparent by describing in detail exemplary embodiments thereof with reference to the attached drawings. In the specification, a system is a set of logical configurations of a plurality of devices and the devices are not necessarily included in a package.

According to an embodiment of the invention, a primary data storage region and a data storage region are set in a flash memory for recording data, a data recording process of recording data which is sequentially generated is executed in the primary data storage region, a data recording state of the primary data storage region is detected, it is determined whether the data recording state is a predefined state, a data connecting process of connecting the data recorded in the primary data storage region is executed when the data recording state is the predefined state, and a data writing process of writing the connected data in the data storage region is executed, thereby reducing an invalid data region generated in a data writing process for the flash memory.

According to the embodiment of the invention, when the data is connected and rewritten from the primary data storage region to the data storage region, a process of maintaining and updating the state values indicating the processing states of the primary data storage region and the data storage region is executed. Thus, for example, even when a power source is turned off while executing the process, a proper process can restart after the power source is turned on.

DETAILED DESCRIPTION

Hereinafter, an information processing device, an image pickup device, an information processing method and a computer program according to embodiments of the invention will be described in detail with reference to the drawings.

Figure 1:
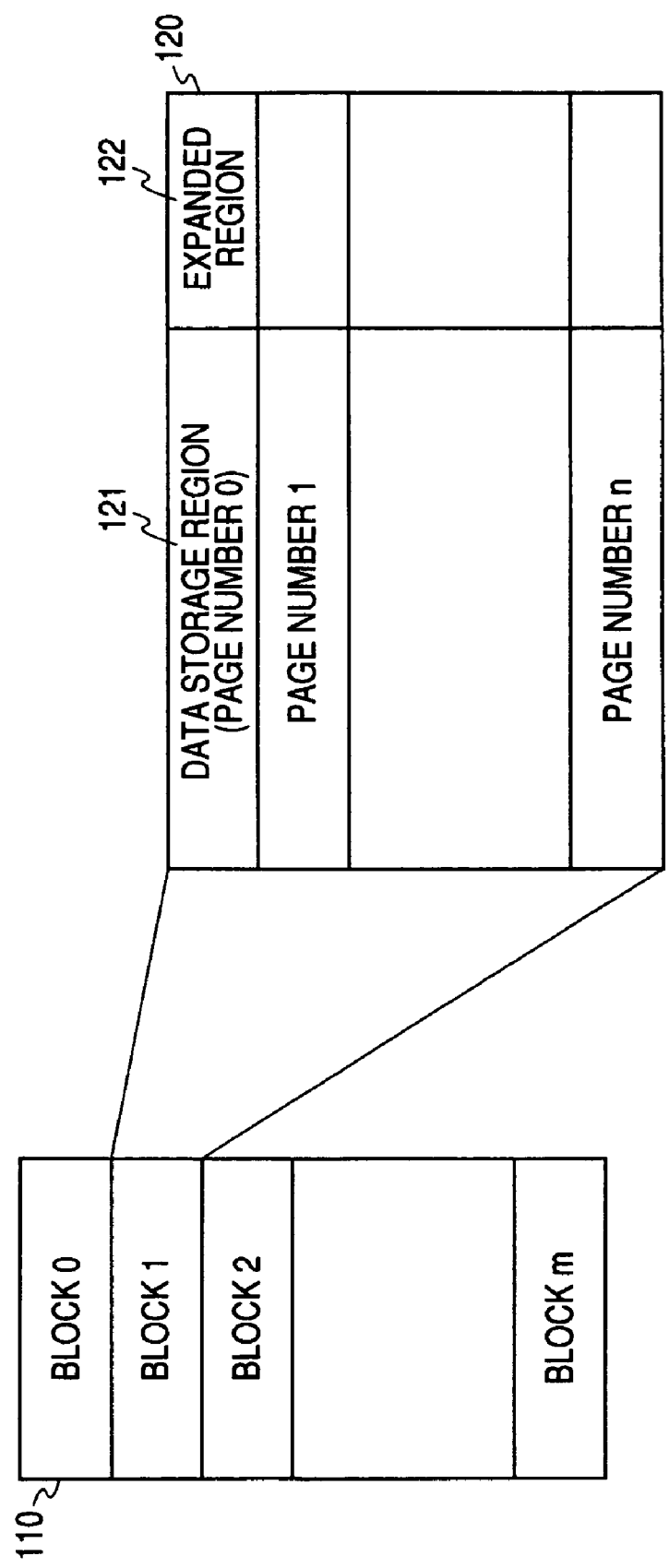
FIG. 1 is a view showing a data recording process unit of a flash memory.
Figure 2:
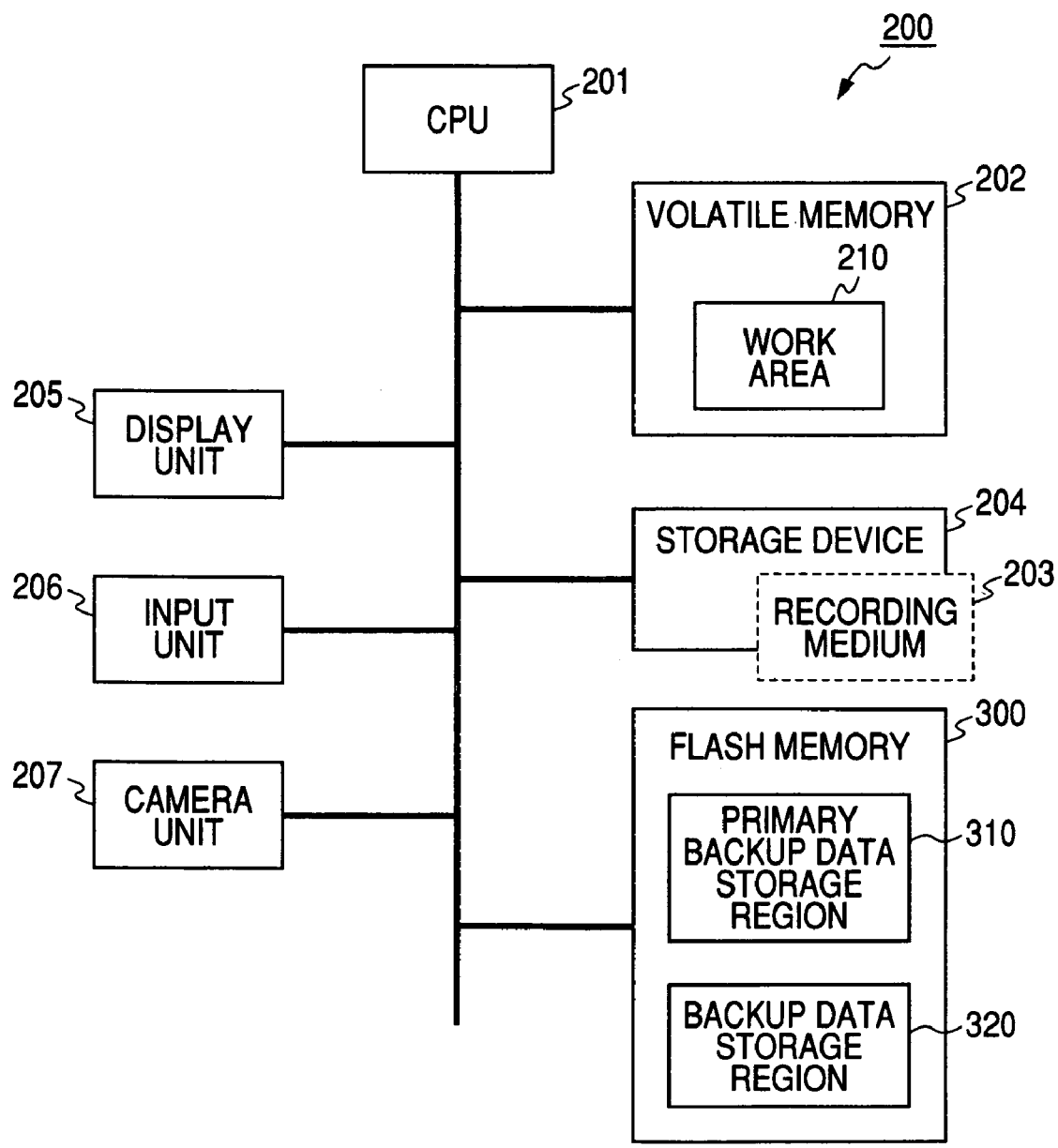
FIG. 2 is a view showing the configuration of an image pickup device as an information processing device according to an embodiment of the invention.

First, an image pickup device which is an example of the information processing device according to the embodiment of the invention will be described with reference to FIG. 2. The image pickup device 200 shown in FIG. 2 includes a central processing unit (CPU) 201 which functions as a control unit for controlling a data recording/reproducing process executed in the device.

In the CPU 201, a variety of programs such as a data recording process and a data reproducing process is executed. A temporary work area 210 for executing these data processing programs is provided by a volatile memory 202 such as a RAM.

The image pickup device 200 includes, for example, a storage device 204 for executing the data recording process and the data reproducing process for a recording medium 203 including a DVD or a hard disc.

A flash memory 300 for recording backup data such as management information such as information necessary for data record/reproduction such as a file allocation table (FAT) or metadata such as reproduction control information is included. In the flash memory 300, management information such as the FAT on a data file of moving picture data photographed by the image pickup device 200 is recorded as the backup data. When the moving picture data is recorded in the recording medium 203, the backup data is recorded or updated in the flash memory 300, as the management information corresponding to the recorded moving picture data.

The flash memory 300 includes a primary backup data storage region 310 and a backup data storage region 320, as shown in the drawing. In the information processing device according to the embodiment of the invention, since a connecting and rewriting process is executed using the regions, an invalid region of the flash memory can be reduced and the data can be maintained with more certainty. The process will be described in detail later.

The image pickup device 200 includes a display unit 205 which is used as a display screen for reproducing and displaying recorded data or an interface for operation of a user, and input unit 206 for receiving the operation of the user, and a camera unit 207 for converting a photographed image into an electrical signal.

As described above, the flash memory 300 includes the primary backup data storage region 310 for temporarily maintaining the backup data and the backup data storage region 320. When data to be written in the flash memory 300 is generated, the data is recorded in the primary backup data storage region 310 and then rewritten in the backup data storage region 320.

Upon the rewriting process, the work area 210 of the volatile memory 201 such as the RAM is used. That is, the work area 210 of the volatile memory 201 is used as a data processing work region for reading and connecting the data recorded in the primary backup data storage region 310 and rewriting the data in the backup data storage region 320.

Next, a process of rewriting the backup data temporarily recorded in the primary backup data storage region 310 of the flash memory 300 in the backup data storage region 320 will be described in detail with reference to FIG. 3.

When the data to be written in the flash memory 300 is generated, the data is sequentially recorded in each page of the primary backup data storage region 310. Then, the data is rewritten in the backup data storage region 320. Upon the rewriting process, the data which is scattered in the pages of the primary backup data storage region 310 is read and connected in the work area 210 of the volatile memory 202 such as the RAM and rewritten in the backup data storage region 320.

The data connecting process is executed in a range which does not exceed the amount of the data for the page defined in the flash memory 300 and the connected data is written in the page of the backup data storage region 320 of the flash memory 300.

Figure 3:
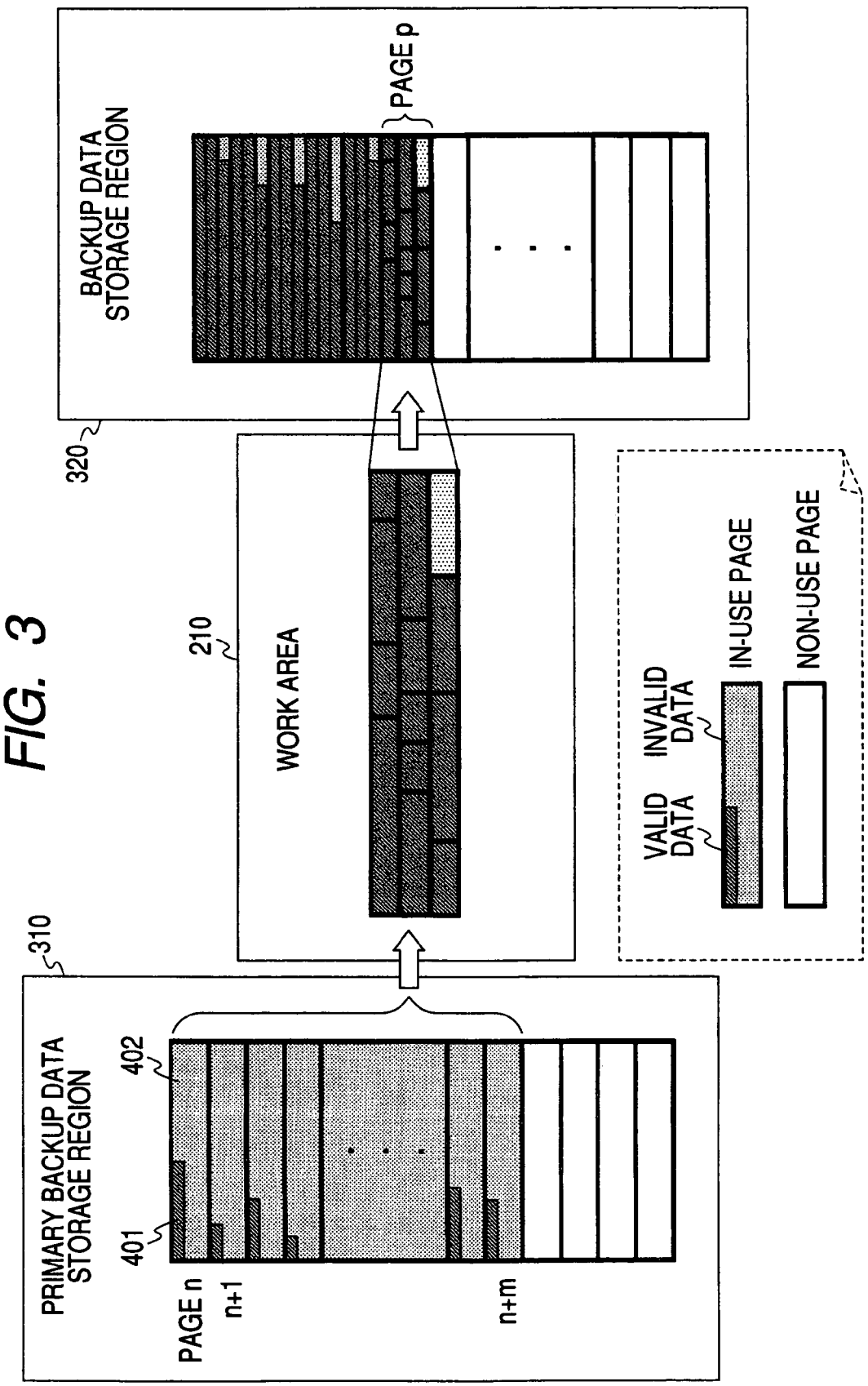
FIG. 3 is a view showing the overview of a data rewriting process in the information processing apparatus according to the embodiment of the invention.

As shown in FIG. 3, the backup data is sequentially written in the primary backup data storage region 310, but a writing process using one page is executed whenever each writing process is generated. When a plurality of data writing processes is executed, as shown in the primary backup data storage region 310 shown in FIG. 3, a small amount of valid data is stored in a plurality of pages n to n+m of the primary backup data storage region 310 and a large invalid data region is generated in each of the pages n to n+m. For example, in the page n of the primary backup data storage region 310 shown in FIG. 3, the valid data 401 is recorded, but invalid data 402 occupies the other region thereof. The same is true in the other pages and only a small amount of valid data is recorded in each page.

The CPU 201 monitors a written state of the data recorded in the primary backup data storage region 310, copies the valid data in the primary backup data storage region 310 to the work area 210 when the recorded data in the primary backup data storage region 310 satisfies a predefined condition, and executes the connecting process. The CPU also executes a process of writing the connected data generated in the work area 210 in the backup data storage region 320.

The data connecting process is executed in a range which does not exceed the capacity of the page defined in the flash memory 300, as described above, and the connected data is written in one page of the backup data storage region 320 of the flash memory 300. The example shown in the drawing shows an example of a process of writing the connected data of the work area 210 in a page p of the backup data storage region 320 of the flash memory 300.

By executing the rewriting process, the occupancy ratio of the valid data of each page of the backup data storage region 320 of the flash memory 300 increases and an invalid data region is reduced.

Figure 4:
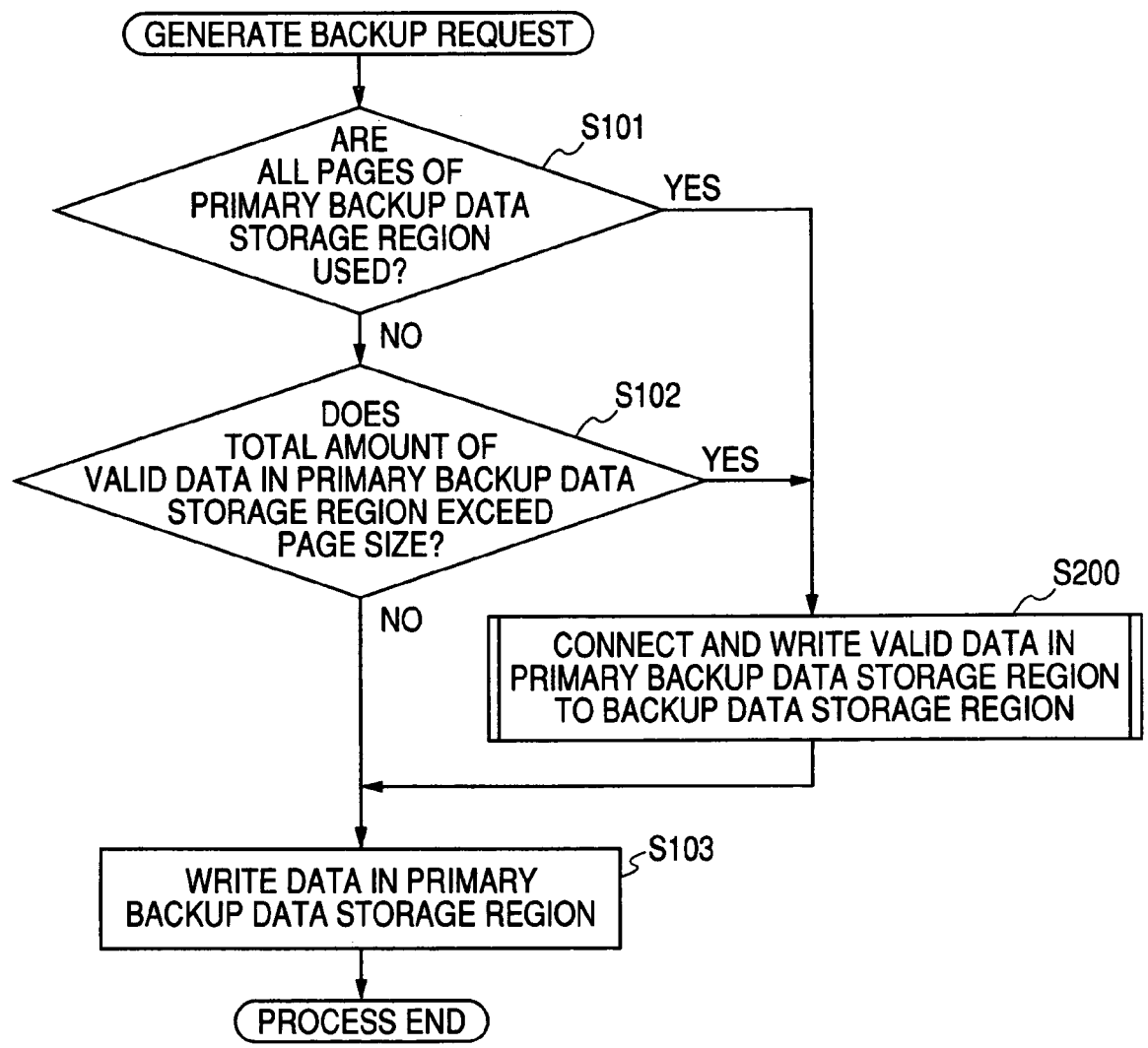
FIG. 4 is a flowchart showing the sequence of a data writing process in the information processing device according to the embodiment of the invention.

In the information processing device according to the embodiment of the invention, the sequence of the data recording process for the flash memory will be described with reference to the flowchart of FIGS. 4 and 5. FIG. 4 shows a process executed under the control of the CPU 201 whenever a backup request, that is, a request for writing the management information such as the FAT or the metadata, is generated.

When the backup data writing request is generated, in a step S101, it is determined whether all the pages of the primary backup data storage region 310 are used. If all the pages are used, the process progresses to a step S200. In the step S200, the data connecting and rewriting process described with reference to FIG. 3, that is, the process of connecting the valid data in the primary backup data storage region 310 and rewriting the valid data in the backup data storage region 320, is executed. This process sequence will be described later with reference to the flowchart shown in FIG. 5.

In the step S101, it is determined that all the pages of the primary backup data storage region 310 are not used, the process progresses to a step S102, in which it is determined whether the total amount of the data including the valid data in the primary backup data storage region 310 and backup data to be recorded exceeds the size of the page defined in the flash memory 300. This process is executed as a process of determining whether the total amount of the data including the valid data already recorded in the primary backup data storage region 310 and the backup data, which is newly generated to be recorded, exceeds the size of the page.

When it is determined that the total amount of the data including the valid data recorded in the primary backup data storage region 310 and the backup data to be recorded exceeds the size of the page defined in the flash memory 300, the process progresses to the step S200, in which the rewriting process described with reference to FIG. 3 is executed.

When it is determined that all the pages of the primary backup data storage region 310 are not used in the step S101 and it is determined that the total amount of the data including the valid data recorded in the primary backup data storage region 310 and the backup data to be recorded does not exceed the size of the page defined in the flash memory 300 in the step S102, the process progresses to a step S103, in which a process of recording the backup data to be recorded in a usable page of the primary backup data storage region 310 is executed.

When it is determined that all the pages of the primary backup data storage region 310 are used in the step S101 or it is determined that the total amount of the data including the valid data recorded in the primary backup data storage region 310 and the backup data to be recorded exceeds the size of the page defined in the flash memory 300 in the step S102, the valid data recorded in the primary backup data storage region 310 is connected and rewritten in the backup data storage region 320 and the data of the primary backup data storage region 310 is erased (flashed) in the step S200 and then the process progresses to the step S103, in which the process of recording the backup data to be recorded in the usable page of the primary backup data storage region 310 is executed.

Next, the detailed sequence of the data rewriting process of the step S200 shown in FIG. 4 will be described in detail with reference to the flowchart shown in FIG. 5. The process shown in FIG. 5 is executed under the control of the CPU 201 as the control unit, when it is determined that all the pages of the primary backup data storage region 310 are used in the step S101 shown in FIG. 4 or it is determined that the total amount of the data including the valid data recorded in the primary backup data storage region 310 and the backup data to be recorded exceeds the size of the page defined in the flash memory 300 in the step S102.

In the data connecting and rewriting process, the state values of the primary backup data storage region 310 and the backup data storage region 320 are set and the process is executed according to the state values. The state values are managed in accordance with two states including (a) a movement start state, and (b) a movement end state.

Figure 6:
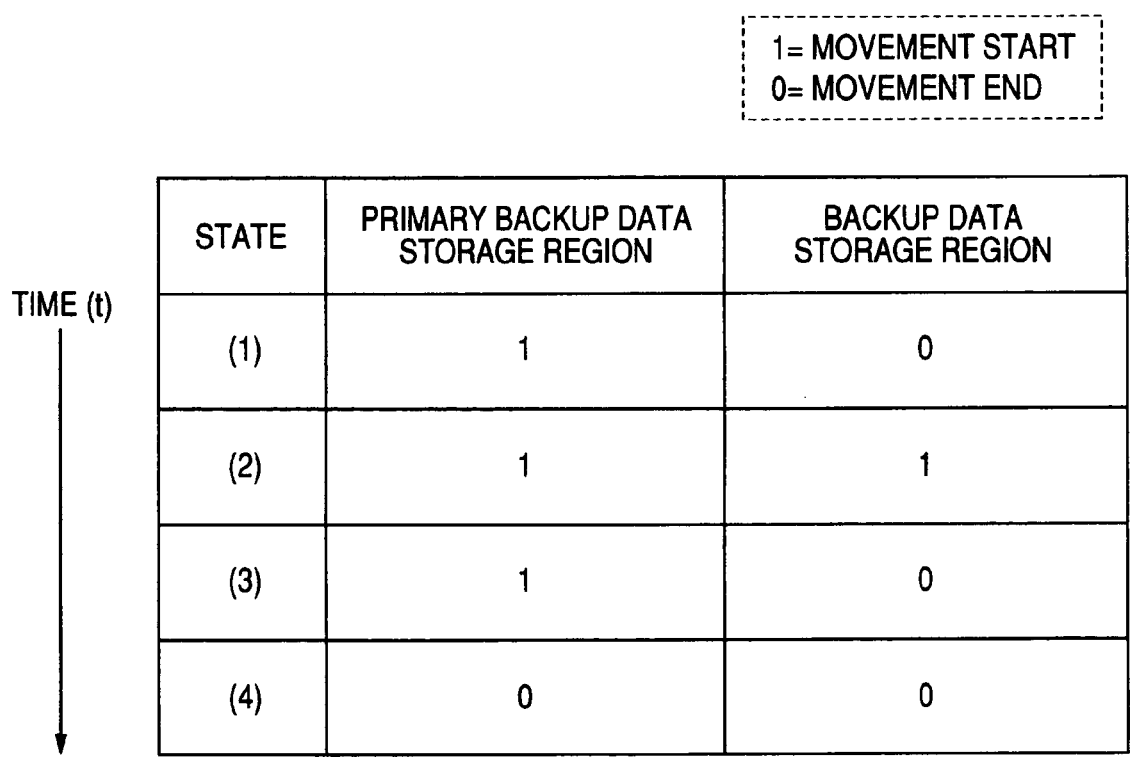
FIG. 6 is a view showing transition of a state value of each region upon executing the data connecting and rewriting process in the information processing device according to the embodiment of the invention.

FIG. 6 shows a temporal transition of the state value of each region managed by the CPU 201 upon performing the data connecting and rewriting process. The state values may be, for example, recorded using the storage region in the flash memory 300 or a separate EEPROM may be mounted and the state values may be recorded in the EEPROM.

The steps of the flowchart shown in FIG. 5 will be described with reference to the transition of the state values shown in FIG. 6. First, in a step S201, the primary backup data storage region 310 is set to the movement start state. This state is a state (1) shown in FIG. 6. In an initial state, both the primary backup data storage region 310 and the backup data storage region 320 are in the movement end state.

Next, in a step S202, the valid data recorded in the primary backup data storage region 310 is read and copied to the work area 210 of the volatile memory 202, and the copied data is connected. This is the process described with reference to FIG. 3.

Next, in a step S203, the backup data storage region 320 is set to the movement start state. This state is a state (2) shown in FIG. 6.

Next, in a step S204, a process of writing the data connected in the work area 210 in the backup data storage region 320 is executed. The data writing process is executed by selecting the usable page from the backup data storage region 320 and writing the data in the selected page. For example, the data writing process corresponds to the process of writing the data in the page p of the backup data storage region 320, described with reference to FIG. 3.

Next, in a step S205, the backup data storage region 320 is set to the movement end state. This state is a state (3) shown in FIG. 6. Next, in a step S206, the primary backup data storage region 310 is set to the movement end state. This is a state (4) shown in FIG. 6.

By these processes, the rewriting process, that is, the process of connecting the valid data of the primary backup data storage region 310 in the work area 210 and writing the valid data in the backup data storage region 320, is finished.

The transition of the state values shown in FIG. 6 will be described. The CPU 201 which is the control unit sets the state value of the primary backup data storage region 310 to the movement start state value 1 before executing the process of copying the backup data recorded in the primary backup data storage region 310 in the work area 210. In addition, the CPU 201 sets the state value of the backup data storage region 320 to the movement start state value 1 before executing the process of writing the connected data generated in the work area 210 in the backup data storage region 320. Thereafter, the process of setting the state values of the primary backup data storage region 310 and the backup data storage region 320 to the movement end state value 0 is executed, when the process of writing the connected data generated in the work area 210 in the backup data storage region 320 is finished. By the process of updating the state values, it is possible to determine the process state, for example, even when the power source is turned off during the process and to execute the process after the power source is turned on again, without error.

Figure 5:
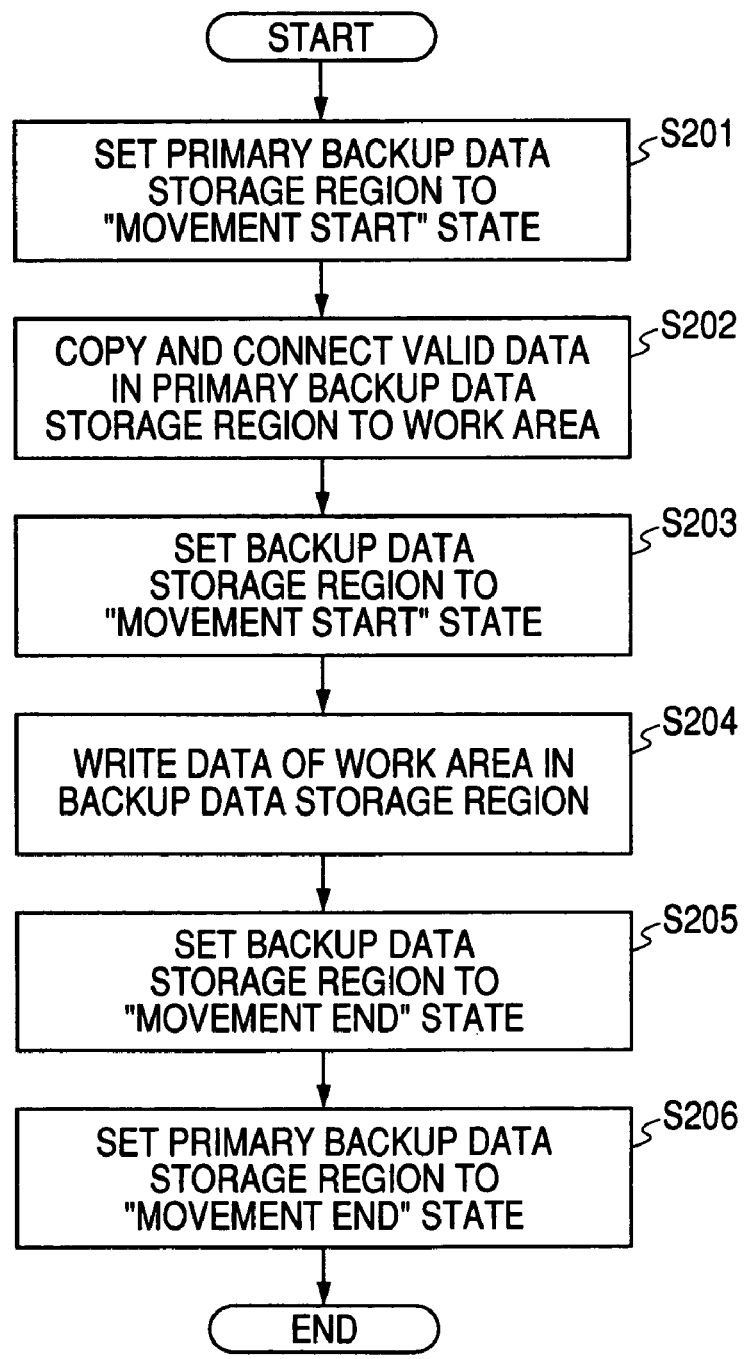
FIG. 5 is a flowchart showing the sequence of a data connecting and rewriting process in the information processing device according to the embodiment of the invention.

After the data connecting and rewriting process according to the flowchart shown in FIG. 5 is executed, the process of the step S103 of the flowchart shown in FIG. 4, that is, the process of writing new backup data in the primary backup data storage region 310, is executed. Before writing the new backup data, the data of the block unit is erased from the primary backup data storage region 310 to newly set a usable page region. The new backup data is written in the writable page which is subjected to a flash process.

While the invention has been particularly shown and described with reference to exemplary embodiments thereof, it will be understood by those skilled in the art that the embodiment may be changed and altered without departing from scope of the invention as defined by the appended claims. That is, the exemplary embodiment of the invention should be considered in descriptive sense only and not for the purpose of limitation. The scope of the invention is defined by the appended claims.

A series of processes described in the specification may be executed by hardware, software or a combination thereof. When the process is executed by the software, a program, in which the process sequence is recorded, may be installed and executed in a memory of a computer included in dedicated hardware or a program may be installed and executed in a general-purpose computer for executing various processes.

For example, the program may be previously recorded in a hard disc or a read only memory (ROM) as a recording medium. Alternatively, the program may be temporarily or permanently stored (recorded) in a removable recording medium such as a flexible disc, a compact disc read only memory (CD-ROM), a magneto optical (MO) disc, a digital versatile disc (DVD), a magnetic disc, or a semiconductor memory. Such a removable recording medium may be provided as so-called package software.

The program may be wireless-transmitted from a download site to a computer or wired-transmitted to a computer through a network such as a local area network (LAN) or the Internet, instead of installing the program in the above-described removable recording medium. In the computer, the transmitted program may be received and installed in a recording medium such as a built-in hard disc.

The various processes described in the specification may be executed in sequence as described above or in parallel or independently in accordance with the requirement or the process capability of a device for executing the process. In the specification, a system is a set of logical configurations of a plurality of devices and the devices are not necessarily included in a package.

As described above, according to an embodiment of the invention, a primary data storage region and a data storage region are set in a flash memory for recording data, a data recording process of recorded data which is sequentially generated is executed in the primary data storage region, a data recording state of the primary data storage region is detected, it is determined whether the data recording state becomes a predefined state, a process of connecting the data recorded in the primary data storage region is executed when the data recording state becomes the predefined state, and a process of writing the connected data generated by the connecting process in the data storage region is executed, thereby reducing an invalid data region generated in a data writing process for the flash memory.

According to the embodiment of the invention, when the data is connected and rewritten from the primary data storage region to the data storage region, a process of maintaining and updating the state values indicating the processing states of the primary data storage region and the data storage region is executed. Thus, for example, even when a power source is turned off while executing the process, a proper process can restart after the power source is turned on.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing device for executing a data recording process for a non-volatile flash memory having a non-volatile primary data storage region and a non-volatile backup data storage region, in which the non-volatile primary data storage region and the non-volatile backup data storage region each have a respective plurality of pages associated therewith, the device comprising:
a control unit operable to determine at least one of (i) whether all the pages in the primary data storage region of the flash memory are currently used and (ii) whether a total amount of data recorded in the primary data storage region of the flash memory and data to be recorded exceeds an amount of data of one page of the flash memory, and when a result thereof indicates that either all the pages in the primary data storage region of the flash memory are currently used or that the total amount of data recorded in the primary data storage region of the flash memory and data to be recorded exceeds the amount of data of one page of the flash memory to execute a data connecting process of connecting data recorded in the primary data storage region and a data writing process of writing the connected data into one or more pages of the backup data storage region such that the ratio of valid data to invalid data in each used page of the backup data storage region is greater than the ratio of valid data to invalid data in each respective used paged of the primary data storage region prior to execution of the data connecting process and the data writing process, and when the result thereof indicates that all the pages in the primary data storage region of the flash memory are not currently used and that the total amount of data recorded in the primary data storage region of the flash memory and data to be recorded does not exceed the amount of data of the one page of the flash memory to execute a recording process in which the data is recorded in a non-currently used page of the primary data storage region of the flash memory.

2. The information processing device according to claim 1, wherein the control unit is operable to maintain values indicating a start state and an end state of data movement as state values of the primary data storage region and the backup data storage region and to execute a process of updating the state values when executing the data connecting process and the data writing process.

3. The information processing device according to claim 2, wherein the control unit is operable to set the state value of the primary data storage region to a movement start state value before executing a process of copying the data recorded in the primary data storage region in a work area, to set the state value of the backup data storage region to a movement start state value before executing the data writing process for the connected data generated in the work area, and to set the state values of the primary data storage region and the backup data storage region to a movement end state value when the writing process for the connected data generated in the work area is finished.

4. An image pickup device, comprising:
a camera unit operable to photograph a moving picture or a still image;
a non-volatile flash memory having a non-volatile primary data storage region and a non-volatile backup data storage region, in which the non-volatile primary data storage region and the non-volatile backup data storage region each have a plurality of pages associated therewith; and
a control unit operable to determine at least one of (i) whether all the pages in the primary data storage region of the flash memory are currently used and (ii) whether a total amount of data recorded in the primary data storage region of the flash memory and data to be recorded exceeds an amount of data of one page of the flash memory, and when a result thereof indicates that either all the pages in the primary data storage region of the flash memory are currently used or that the total amount of data recorded in the primary data storage region of the flash memory and data to be recorded exceeds the amount of data of one page of the flash memory to execute a data connecting process of connecting data recorded in the primary data storage region and a data writing process of writing the connected data into one or more pages of the backup data storage region such that the ratio of valid data to invalid data in each used page of the backup data storage region is greater than the ratio of valid data to invalid data in each respective used paged of the primary data storage region prior to execution of the data connecting process and the data writing process, and when the result thereof indicates that all the pages in the primary data storage region of the flash memory are not currently used and that the total amount of data recorded in the primary data storage region of the flash memory and data to be recorded does not exceed the amount of data of the one page of the flash memory to execute a recording process in which the data is recorded in a non-currently used page of the primary data storage region of the flash memory.

5. An information processing method for executing a data recording process for a non-volatile flash memory having a non-volatile primary data storage region and a non-volatile backup data storage region, in which the non-volatile primary data storage region and the non-volatile backup data storage region each have a plurality of pages associated therewith, the method comprising:

executing the data recording process for the primary data storage region of the flash memory; and determining at least one of (i) whether all the pages in the primary data storage region of the flash memory are currently used and (ii) whether a total amount of data recorded in the primary data storage region of the flash memory and data to be recorded exceeds an amount of data of one page of the flash memory, and when a result thereof indicates that either all the pages in the primary data storage region of the flash memory are currently used or that the total amount of data recorded in the primary data storage region of the flash memory and data to be recorded exceeds the amount of data of one page of the flash memory executing a data connecting process of connecting data recorded in the primary data storage region and a data writing process of writing the connected data into one or more pages of the backup data storage region such that the ratio of valid data to invalid data in each used page of the backup data storage region is greater than the ratio of valid data to invalid data in each respective used paged of the primary data storage region prior to execution of the data connecting process and the data writing process, and when the result thereof indicates that all the pages in the primary data storage region of the flash memory are not currently used and that the total amount of data recorded in the primary data storage region of the flash memory and data to be recorded does not exceed the amount of data of the one page of the flash memory executing a recording process in which the data is recorded in a non-currently used page of the primary data storage region of the flash memory.

6. The information processing method according to claim 5, further comprising:

maintaining values indicating a start state and an end state of data movement as state values of the primary data storage region and the backup data storage region; and executing a process of updating the state values when executing the data connecting process and the data writing process.

7. The information processing method according to claim 6, wherein the process of updating the state values includes setting the state value of the primary data storage region to a movement start state value before executing a process of copying data recorded in the primary data storage region in a work area, setting the state value of the backup data storage region to a movement start state value before executing the data writing process for the connected data generated in the work area, and setting the state values of the primary data storage region and the backup data storage region to a movement end state value when the writing process for the connected data generated in the work area is finished.

8. A computer readable medium having stored thereon a computer program for causing an information processing device to execute an information processing method for executing a data recording process for a non-volatile flash memory having a non-volatile primary data storage region and a non-volatile backup data storage region, in which the non-volatile primary data storage region and the non-volatile backup data storage region each have a plurality of pages associated therewith, the information processing method comprising:

executing the data recording process for the primary data storage region of the flash memory; and determining at least one of (i) whether all the pages in the primary data storage region of the flash memory are currently used and (ii) whether a total amount of data recorded in the primary data storage region of the flash memory and data to be recorded exceeds an amount of data of one page of the flash memory, and when a result thereof indicates that either all the pages in the primary data storage region of the flash memory are currently used or that the total amount of data recorded in the primary data storage region of the flash memory and data to be recorded exceeds the amount of data of one page of the flash memory executing a data connecting process of connecting data recorded in the primary data storage region and a data writing process of writing the connected data into one or more pages of the backup data storage region such that the ratio of valid data to invalid data in each used page of the backup data storage region is greater than the ratio of valid data to invalid data in each respective used paged of the primary data storage region prior to execution of the data connecting process and the data writing process, and when the result thereof indicates that all the pages in the primary data storage region of the flash memory are not currently used and that the total amount of data recorded in the primary data storage region of the flash memory and data to be recorded does not exceed the amount of data of the one page of the flash memory executing a recording process in which the data is recorded in a non-currently used page of the primary data storage region of the flash memory.

* * * * *